(12) United States Patent
Izawa

(10) Patent No.: US 8,665,323 B2
(45) Date of Patent: Mar. 4, 2014

(54) STEREOSCOPIC DISPLAY APPARATUS AND METHOD FOR DRIVING STEREOSCOPIC DISPLAY APPARATUS

(75) Inventor: Yosuke Izawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/609,940

(22) Filed: Sep. 11, 2012

(65) Prior Publication Data

US 2013/0002662 A1 Jan. 3, 2013

Related U.S. Application Data

(63) Continuation of application No. PCT/JP2010/002349, filed on Mar. 31, 2010.

(51) Int. Cl.
*H04N 15/00* (2006.01)

(52) U.S. Cl.
USPC .................................. 348/56; 348/54; 348/55

(58) Field of Classification Search
USPC ...................................................... 348/55–57
See application file for complete search history.

(56) References Cited

U.S. PATENT DOCUMENTS

| 7,724,211 | B2 | 5/2010 | Slavenburg et al. |
| 7,742,019 | B2 | 6/2010 | Takahara |
| 7,777,698 | B2 | 8/2010 | Takahara et al. |
| 7,924,248 | B2 | 4/2011 | Takahara |
| 7,932,880 | B2 | 4/2011 | Takahara et al. |
| 8,063,855 | B2 | 11/2011 | Takahara et al. |
| 8,169,467 | B2 | 5/2012 | Slavenburg et al. |
| 8,274,448 | B1 * | 9/2012 | Cook ................................ 345/9 |
| 2005/0168490 | A1 | 8/2005 | Takahara |
| 2005/0168491 | A1 | 8/2005 | Takahara et al. |
| 2005/0180083 | A1 | 8/2005 | Takahara et al. |
| 2007/0229395 | A1 | 10/2007 | Slavenburg et al. |
| 2007/0229487 | A1 | 10/2007 | Slavenburg et al. |
| 2008/0084365 | A1 | 4/2008 | Takahara et al. |

(Continued)

FOREIGN PATENT DOCUMENTS

| JP | 2000-004451 | 1/2000 |
| JP | 2000-036969 | 2/2000 |

(Continued)

OTHER PUBLICATIONS

International Search Report and Written Opinion in International Application No. PCT/JP2010/002349, dated Jun. 22, 2010.

*Primary Examiner* — Christopher S Kelley
*Assistant Examiner* — Jonathan Messmore
(74) *Attorney, Agent, or Firm* — Greenblum & Bernstein, P.L.C.

(57) ABSTRACT

A stereoscopic display apparatus includes: a plurality of light-emitting devices; a power supply line for supplying current to the light-emitting devices; a switching device provided on the power supply line; a glasses control circuit which generates a glasses control signal for setting, in a pair of shutter-type glasses, a non-viewable period in which both the right-eye image and the left-eye image are made non-viewable at the same time; and a power supply control circuit which generates a device control signal for setting, in the switching device, a voltage reduced period in which the voltage between the electrodes in the light-emitting device is reduced, in which the glasses control circuit and the power supply control circuit control the shutter-type glasses and the switching device, respectively, for setting the non-viewable period to be a period at least from a start to an end of the voltage reduced period.

7 Claims, 10 Drawing Sheets

(56) References Cited

U.S. PATENT DOCUMENTS

| | | |
|---|---|---|
| 2009/0179850 A1* | 7/2009 | Chen et al. .................... 345/102 |
| 2009/0184984 A1 | 7/2009 | Takahara |
| 2010/0033462 A1 | 2/2010 | Hasegawa et al. |
| 2010/0060723 A1* | 3/2010 | Kimura et al. .................. 348/56 |
| 2010/0201791 A1 | 8/2010 | Slavenburg et al. |
| 2010/0231696 A1 | 9/2010 | Slavenburg et al. |
| 2010/0265277 A1 | 10/2010 | Takahara |
| 2010/0277401 A1 | 11/2010 | Takahara et al. |
| 2011/0012904 A1 | 1/2011 | Slavenburg et al. |
| 2011/0090320 A1 | 4/2011 | Tsuchida |
| 2011/0157332 A1* | 6/2011 | Kim et al. ....................... 348/56 |
| 2011/0261034 A1 | 10/2011 | Tsuchida et al. |
| 2011/0310099 A1 | 12/2011 | Yamana et al. |
| 2012/0075437 A1 | 3/2012 | Slavenburg et al. |

FOREIGN PATENT DOCUMENTS

| | | |
|---|---|---|
| JP | 2003-122303 | 4/2003 |
| JP | 2008-225506 | 9/2008 |
| JP | 2009-152897 | 7/2009 |
| JP | 2009-531979 | 9/2009 |
| JP | 2010-039399 | 2/2010 |
| JP | 2010-054662 | 3/2010 |
| WO | 2007/126904 | 11/2007 |

* cited by examiner

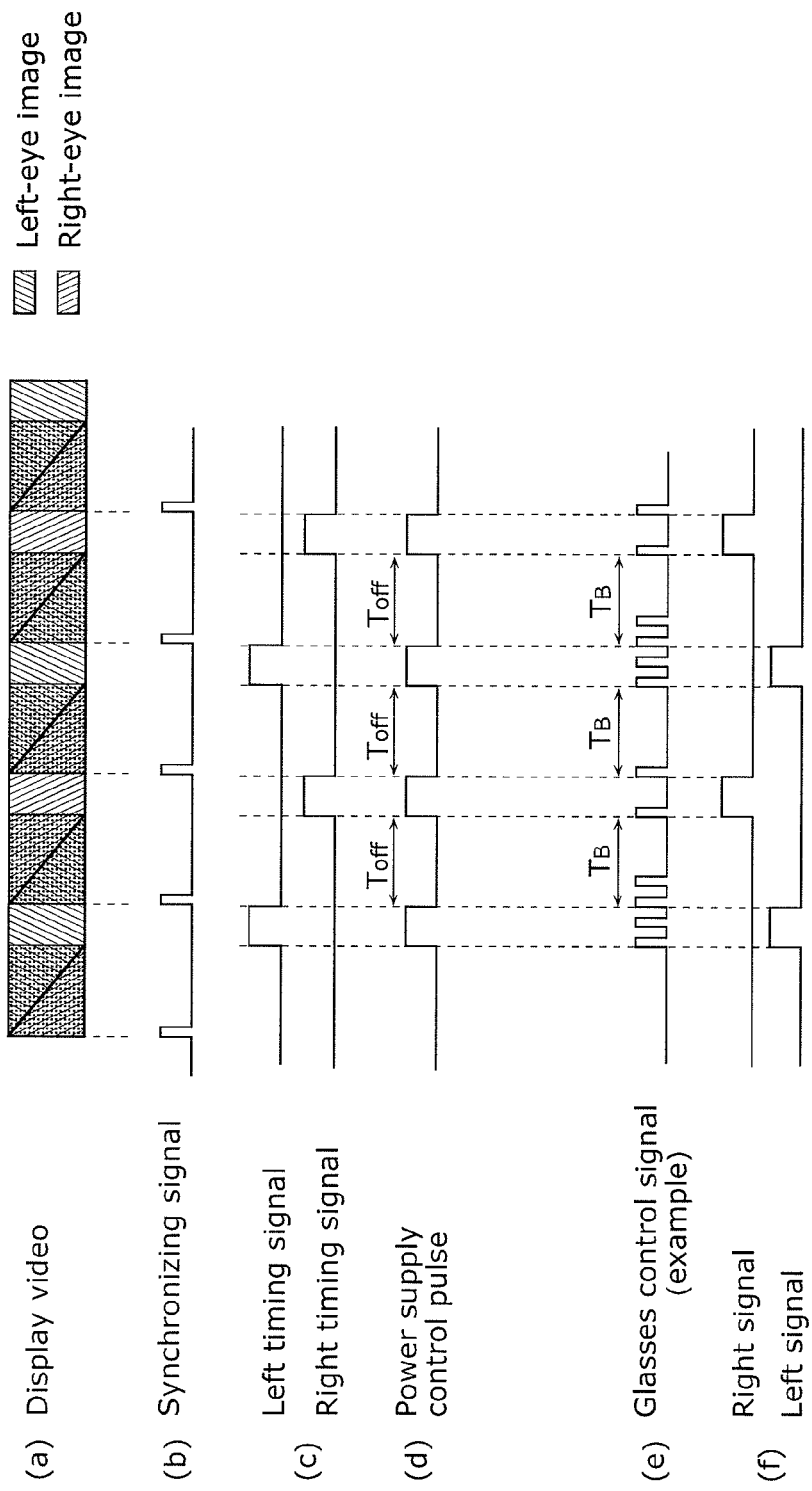

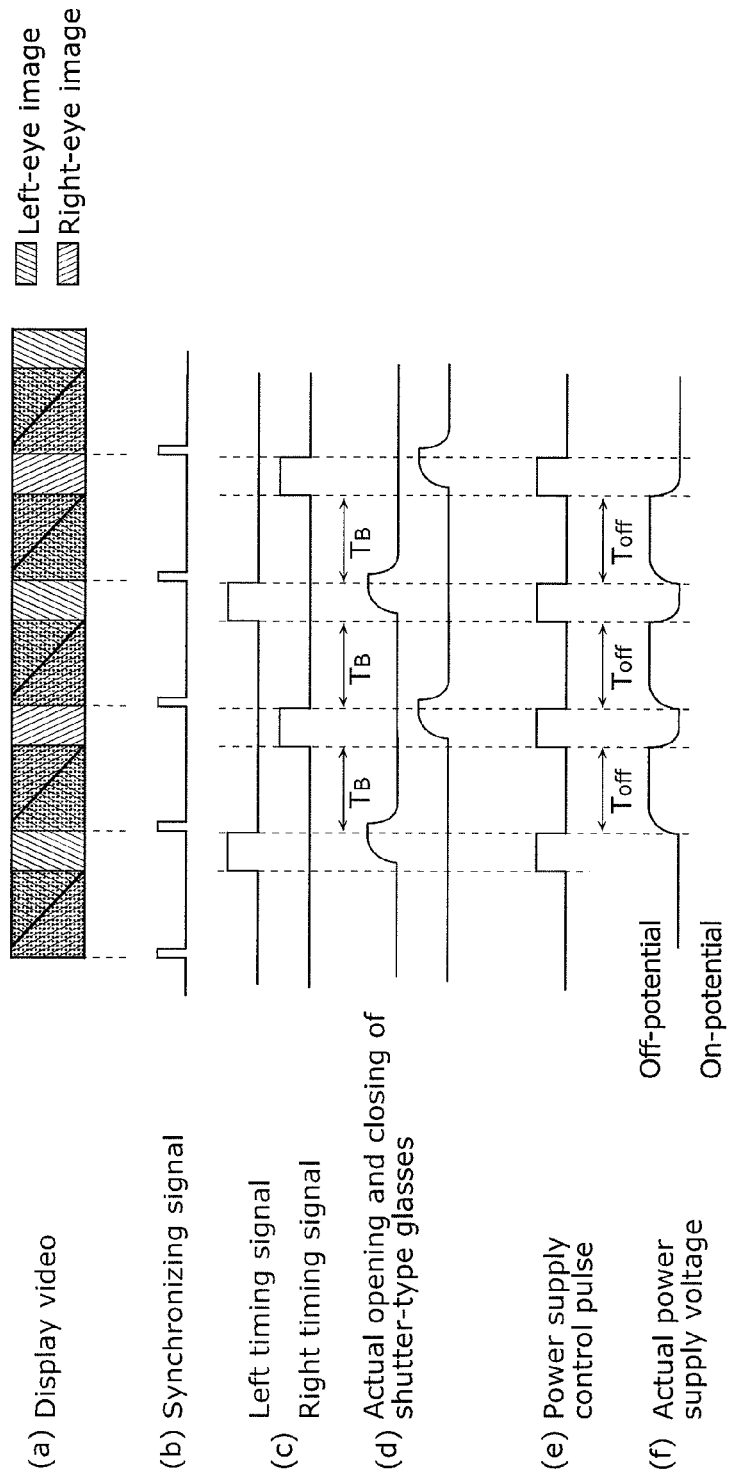

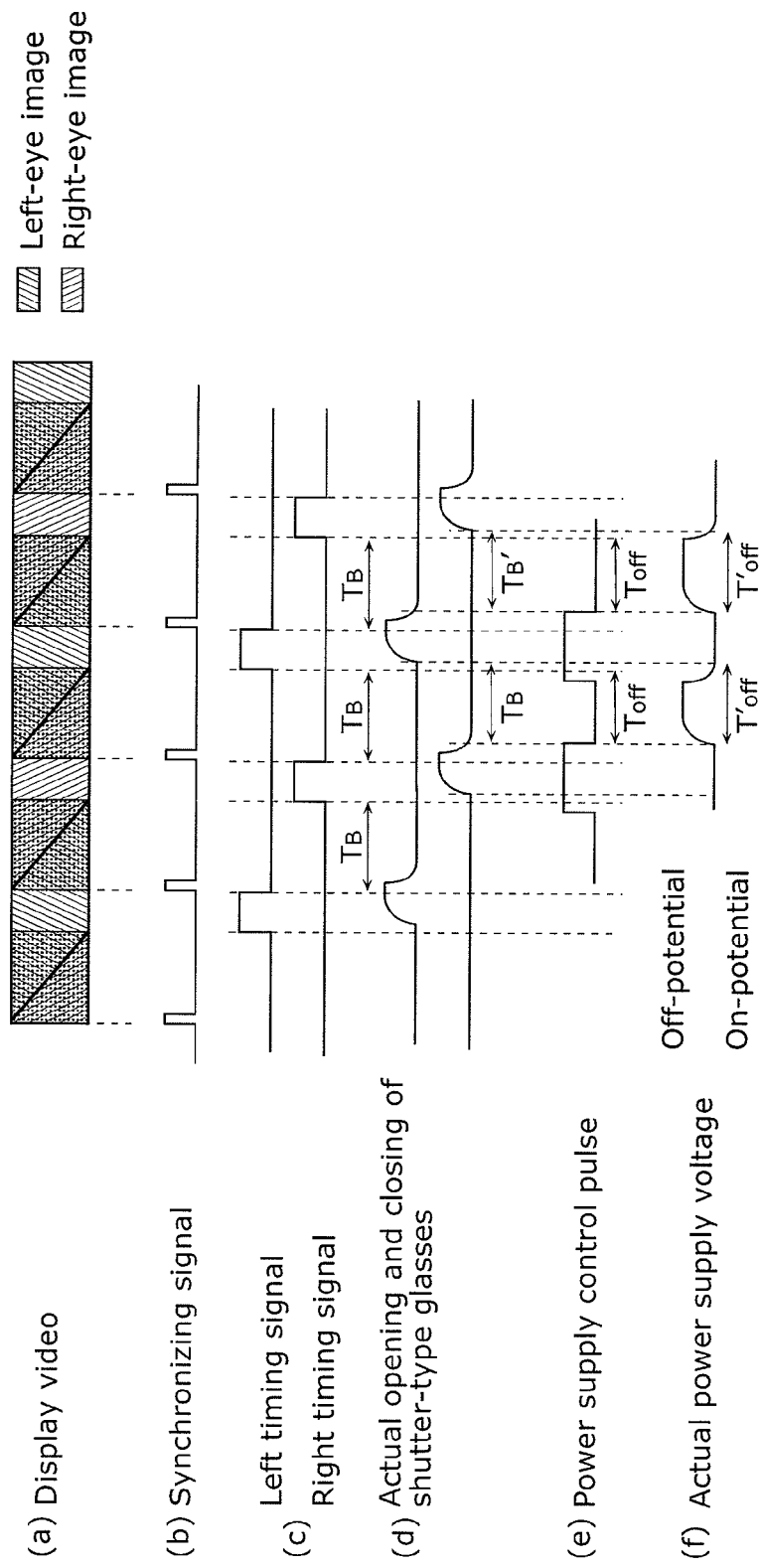

STEREOSCOPIC DISPLAY APPARATUS AND METHOD FOR DRIVING STEREOSCOPIC DISPLAY APPARATUS

CROSS REFERENCE TO RELATED APPLICATION

This is a continuation application of PCT Patent Application No. PCT/JP2010/002349 filed on Mar. 31, 2010, designating the United States of America. The entire disclosure of the above-identified application, including the specification, drawings and claims are incorporated herein by reference in their entirety.

TECHNICAL FIELD

One or more exemplary embodiments disclosed herein relate generally to a stereoscopic display apparatus and a method for driving the stereoscopic display apparatus.

BACKGROUND ART

Stereoscopic display apparatus using various methods for displaying stereoscopic videos have been considered. For example, there is a stereoscopic display apparatus using a method including displaying an video for one eye and an video for the other eye corresponding to disparity for visualizing a stereoscopic video, and alternately switching a left-eye shutter and a right-eye shutter in a glasses unit (for example, see the patent literature 1).

In the stereoscopic display apparatus according to the patent literature 1, a simultaneous light-shielding period is provided in a part of each frame period for suppressing flicker caused by afterimages. In the simultaneous light-shielding period, a right-eye shutter and a left-eye shutter are in a light-shielding state at the same time.

CITATION LIST

Patent Literature

[Patent Literature 1] Japanese Unexamined Patent Application Publication No. 2000-4451

SUMMARY

Technical Problem

However, the stereoscopic display apparatus disclosed in the patent literature 1 has the following problem. More specifically, the image display control on the stereoscopic display apparatus is performed in a simultaneous closed period of the shutter or a period other than the simultaneous closed period in which only one of the shutters is closed. Accordingly, in the holding type display method, there is a problem that excessive power is consumed even if no image can be seen in the simultaneous closed period of the shutters.

One non-limiting and exemplary embodiment provides a stereoscopic display apparatus capable of suppressing power consumption and a method for driving the stereoscopic display apparatus.

Solution to Problem

In one general aspect, the stereoscopic display apparatus disclosed here feature a stereoscopic display apparatus including: an image display unit which sequentially displays a right-eye image and a left-eye image; and a pair of glasses which makes the right-eye image and the left-eye image viewable sequentially, the stereoscopic display apparatus including: a plurality of organic electroluminescence (EL) devices included in a display unit of the image display unit; a power supply line for supplying current to each of the organic EL devices; a switching device provided on the power supply line and capable of reducing a voltage between electrodes in the organic EL device; a first control unit configured to generate a glasses control signal for setting, in the glasses, a non-viewable period in which both the right-eye image and the left-eye image are made non-viewable at the same time; and a second control unit configured to generate a device control signal for setting, in the switching device, a voltage reduced period in which the voltage between the electrodes in the organic EL device is reduced, in which the first control unit and the second control unit control the glasses and the switching device by generating the glasses control signal and the device control signal, respectively, for setting the non-viewable period to be a period at least from a start to an end of the voltage reduced period, and the second control unit is configured to generate the device control signal for setting the voltage reduced period based on a period from a time at which the switching device is turned off to a time at which the switching device is turned on and at least one of (i) a delay period from a time at which the switching device is turned off to a time at which the voltage between the electrodes in the organic EL device is reduced and (ii) a delay period from a time at which the switching device is turned on to a time at which the voltage between the electrodes in the organic EL device is restored to the voltage before the reduction, the non-viewable period being longer than a length of the voltage reduced period.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein provide a stereoscopic display apparatus capable of suppressing the power consumption and the method for driving the stereoscopic display apparatus.

BRIEF DESCRIPTION OF DRAWINGS

These and other advantages and features will become apparent from the following description thereof taken in conjunction with the accompanying Drawings, by way of non-limiting examples of embodiments of the present disclosure.

FIG. 7 is a diagram for illustrating an example of light-emission timing of a display video displayed by the panel according to the embodiment.

FIG. 8 is a diagram illustrating a shutter delay in shutters in the shutter type glasses and a switching delay in the switching device according to the embodiment.

FIG. 9 is a diagram for illustrating another example of light-emission timing for the video displayed on the panel.

DESCRIPTION OF EMBODIMENTS

Figure 1:
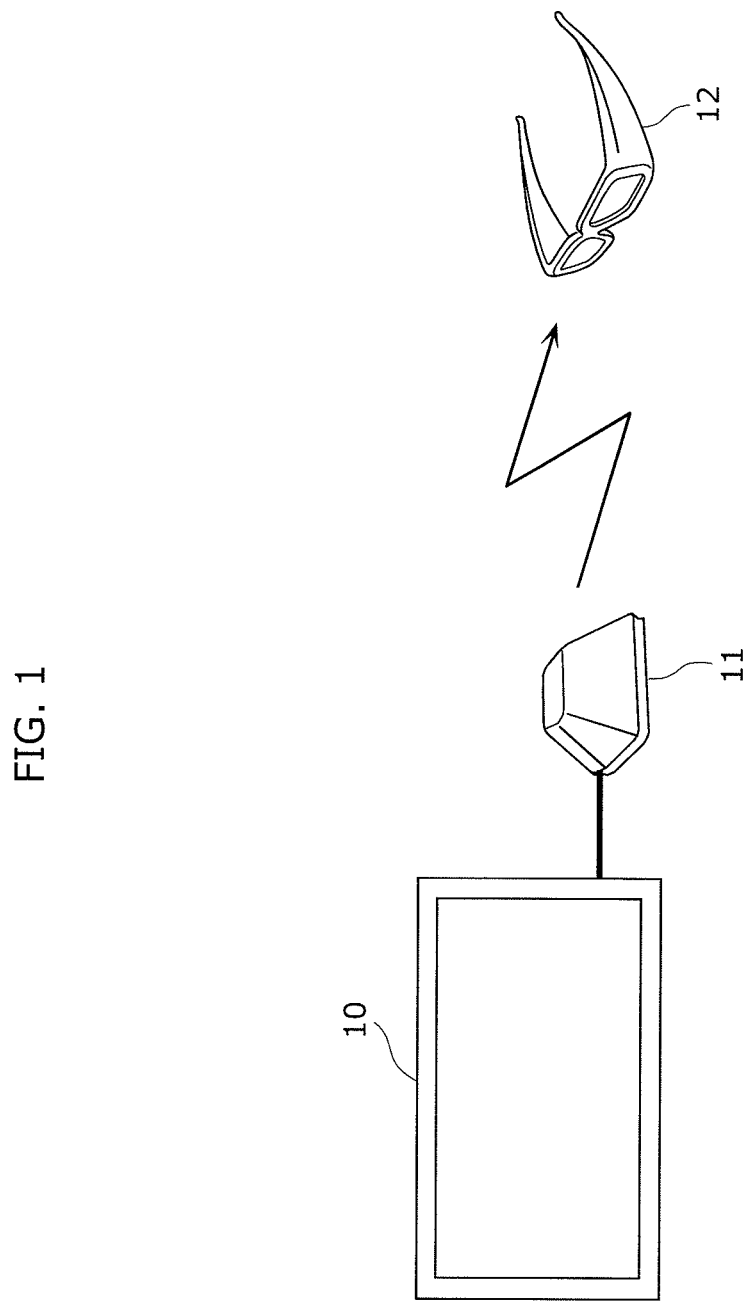
FIG. 1 illustrates an exemplary system configuration of an organic EL display apparatus according to an embodiment.

The stereoscopic display apparatus according to an aspect of the present disclosure is a stereoscopic display apparatus including: an image display unit which sequentially displays a right-eye image and a left-eye image; and a pair of glasses which makes the right-eye image and the left-eye image viewable sequentially, the stereoscopic display apparatus including: a plurality of organic electroluminescence (EL) devices included in a display unit of the image display unit; a power supply line for supplying current to each of the organic EL devices; a switching device provided on the power supply line and capable of reducing a voltage between electrodes in the organic EL device; a first control unit which generates a glasses control signal for setting, in the glasses, a non-viewable period in which both the right-eye image and the left-eye image are made non-viewable at the same time; and a second control unit which generates a device control signal for setting, in the switching device, a voltage reduced period in which the voltage between the electrodes in the organic EL device is reduced, in which the first control unit and the second control unit control the glasses and the switching device by generating the glasses control signal and the device control signal, respectively, for setting the non-viewable period to be a period at least from a start to an end of the voltage reduced period.

According to this aspect, in the closed period, that is, the non-viewable period of the 3D glasses, the power consumption can be reduced by reducing the voltage between the electrodes of the light-emitting device so as to reduce the luminance.

Here, the light-emitting device is an organic EL device.

Furthermore, the second control unit generates the device control signal for setting the voltage reduced period based on a period from a time at which the switching device is turned off to a time at which the switching device is turned on and at least one of (i) a delay period from a time at which the switching device is turned off to a time at which the voltage between the electrodes in the organic EL device is reduced and (ii) a delay period from a time at which the switching device is turned on to a time at which the voltage between the electrodes in the organic EL device is restored to the voltage before the reduction.

According to this aspect, the voltage reduced period can be adjusted in consideration of the delay in the switching device and the light-emitting device. With this, it is possible to adjust the closed period by the timing of the closed period of the 3D glasses, and to reduce the luminance in the light-emitting device.

Furthermore, the second control unit generates a device control signal for setting the voltage reduced period in which the voltage between the electrodes in the organic EL device is reduced to a voltage at which light-emission from the organic EL device is turned off.

According to this aspect, it is possible to stop light-emission of the light-emitting device during the closed period of the 3D glasses, thereby reducing the power consumption further.

Furthermore, the second control unit is configured to generate the device control signal for setting the voltage reduced period such that the non-viewable period is longer than a length of the voltage reduced period.

According to this aspect, the voltage reduced period may be adjusted to the closed period of the 3D glasses. When the closed period of the glasses ends and the image is made viewable, the luminance of the light-emitting device is securely restored.

Furthermore, the glasses includes: shutter units on the right and left; and a receiving unit, and both the right-eye image and the left-eye image are made non-viewable at the same time when the receiving unit receives the glasses control signal and the shutter units are in a closed state.

Here, the non-viewable period may be set based on a period from transmission of the glasses control signal for setting the shutter units to the closed state to transmission of the glasses control signal for setting one of the shutter units to an open state and at least one of (i) a delay period from transmission of the glasses control signal for setting the shutter units to the closed state to a time at which the shutter units are in the closed state and (ii) a delay period from the transmission of the glasses control signal for setting the one of the shutter units to the open state to a time at which the one of the shutter units is in the open state.

According to this aspect, the non-viewable period may be adjusted in consideration of the time (delay) necessary for opening and closing the shutter unit after the glasses receives the glasses control signal. With this, it is possible to adjust the timing of the closed period of the 3D glasses and the voltage reduced period more suitably.

Furthermore, the method for driving the stereoscopic display apparatus according to another aspect of the present disclosure is a method for driving a stereoscopic display apparatus including: an image display unit which sequentially displays a right-eye image and a left-eye image; and a pair of glasses which makes the right-eye image and the left-eye image viewable sequentially, the method including providing a non-viewable period in which both the right-eye image and the left-eye image are made non-viewable at the same time by the glasses and providing a voltage reduced period in which the voltage between electrodes in an organic EL device included in the image display unit is reduced, in which the non-viewable period is adjusted to be a period at least from a start to an end of the voltage reduced period.

Furthermore, the display device is an organic EL device.

Furthermore, the voltage reduced period is set based on a period from a time at which a switching device is turned off to a time at which the switching device is turned on and at least one of (i) a delay period from a time at which the switching device is turned off to a time at which the voltage between the electrodes in the organic EL device is reduced and (ii) a delay period from a time at which the switching device is turned on to a time at which the voltage between the electrodes in the organic EL device is restored to the voltage before the reduction.

Furthermore, the glasses includes: shutter units on the right and left; and a receiving unit, the method further includes making the right-eye image and the left-eye image non-viewable at the same time when the receiving unit receives a glasses control signal for setting the non-viewable period and the shutter units are in a closed state.

Furthermore, the non-viewable period is set based on a period from transmission of the glasses control signal for setting the shutter units to a closed state to transmission of the glasses control signal for setting one of the shutter units to an open state and at least one of (i) a delay period from transmission of the glasses control signal for setting the shutter units to the closed state to a time at which the shutter units are in the closed state and (ii) a delay period from the transmission of the glasses control signal for setting the one of the shutter units to the open state to a time at which the one of the shutter units is in the open state.

Note that, the present disclosure may be implemented not only as a method having an apparatus or units composing the apparatus as steps, but also as an integrated circuit having the units included in the apparatus.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of appended Claims and their equivalents. Therefore, among the structural elements in the following exemplary embodiments, structural elements not recited in any one of the independent claims are described as arbitrary structural elements.

Embodiment

The following shall describe an exemplary embodiment of the present disclosure with reference to the drawings.

Figure 2:
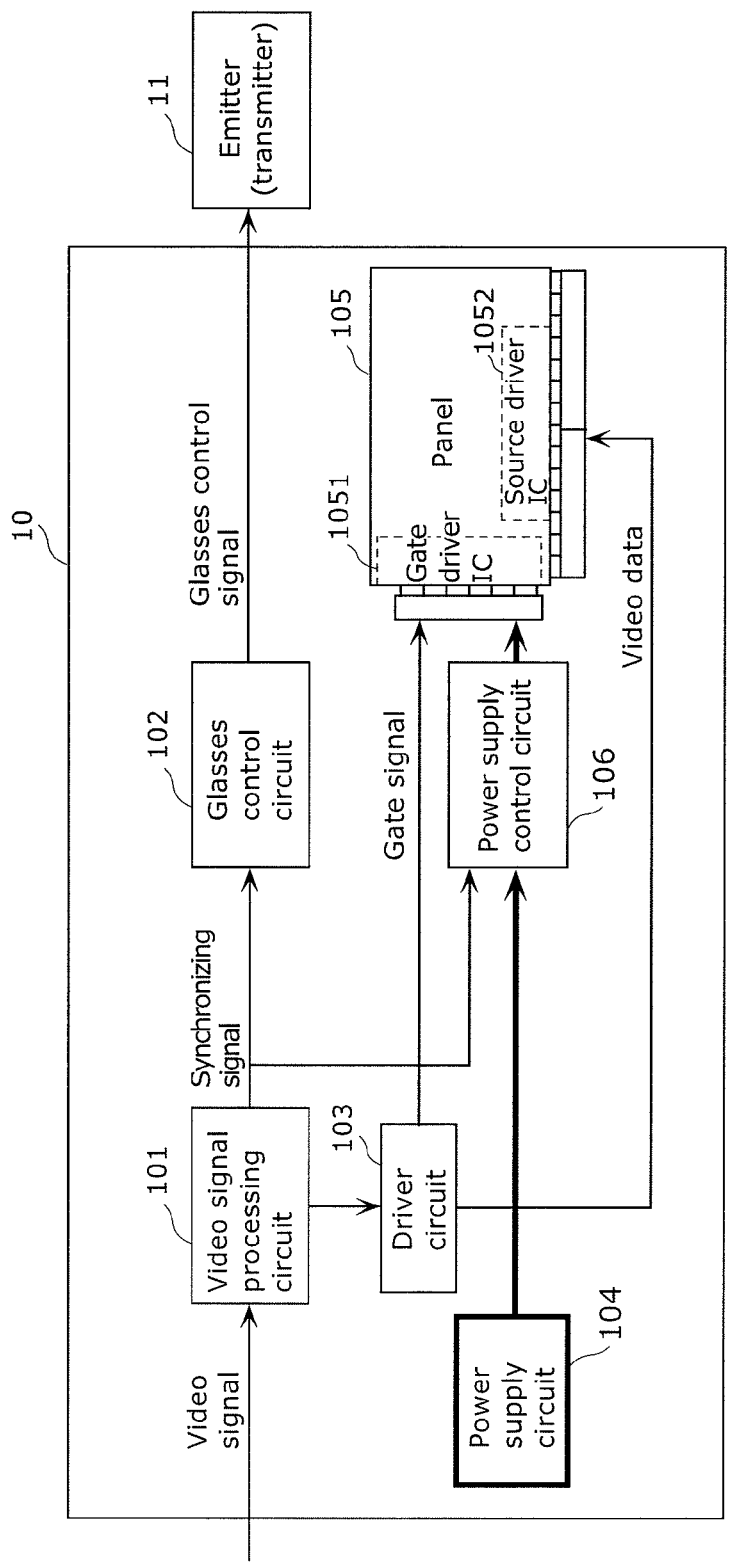
FIG. 2 is a block diagram illustrating a configuration of the organic EL display apparatus according to the embodiment.
Figure 3A:
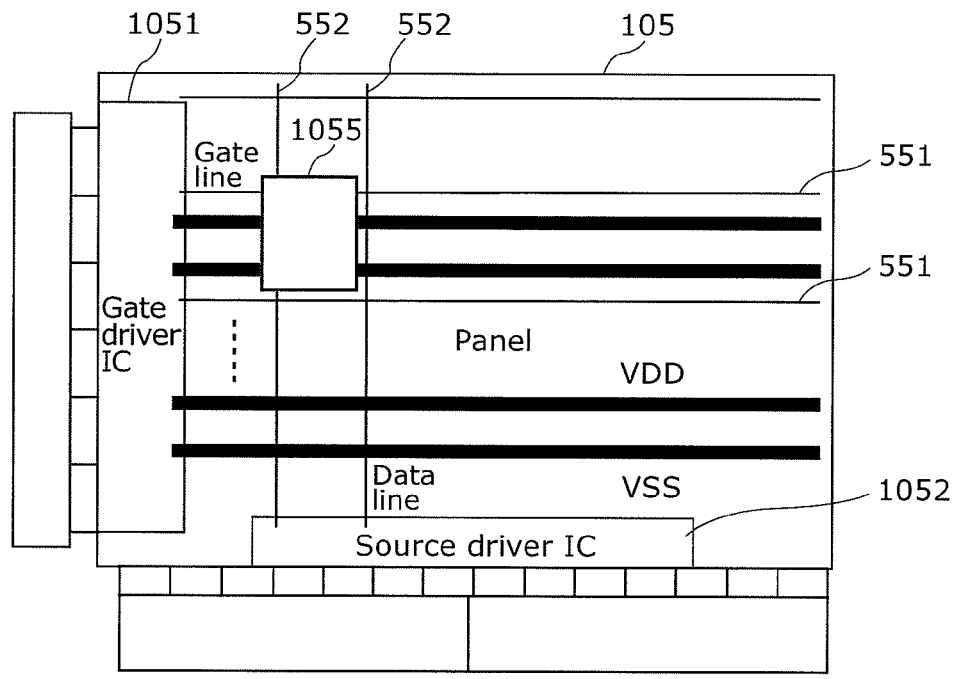
FIG. 3A is a block diagram illustrating a configuration of a panel according to the embodiment.
Figure 3B:
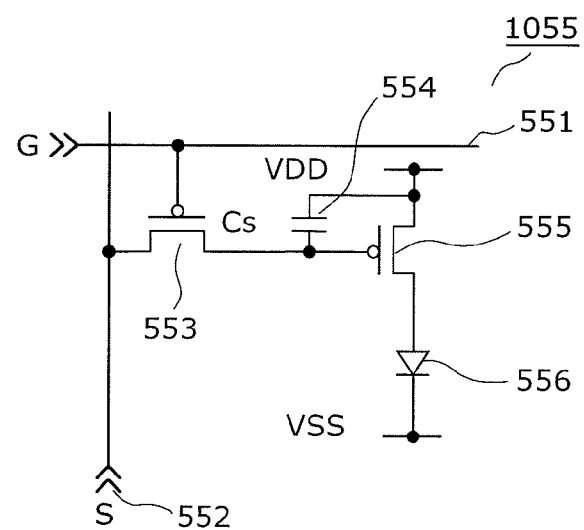
FIG. 3B is a block diagram illustrating the configuration of the panel according to the embodiment.
Figure 4:
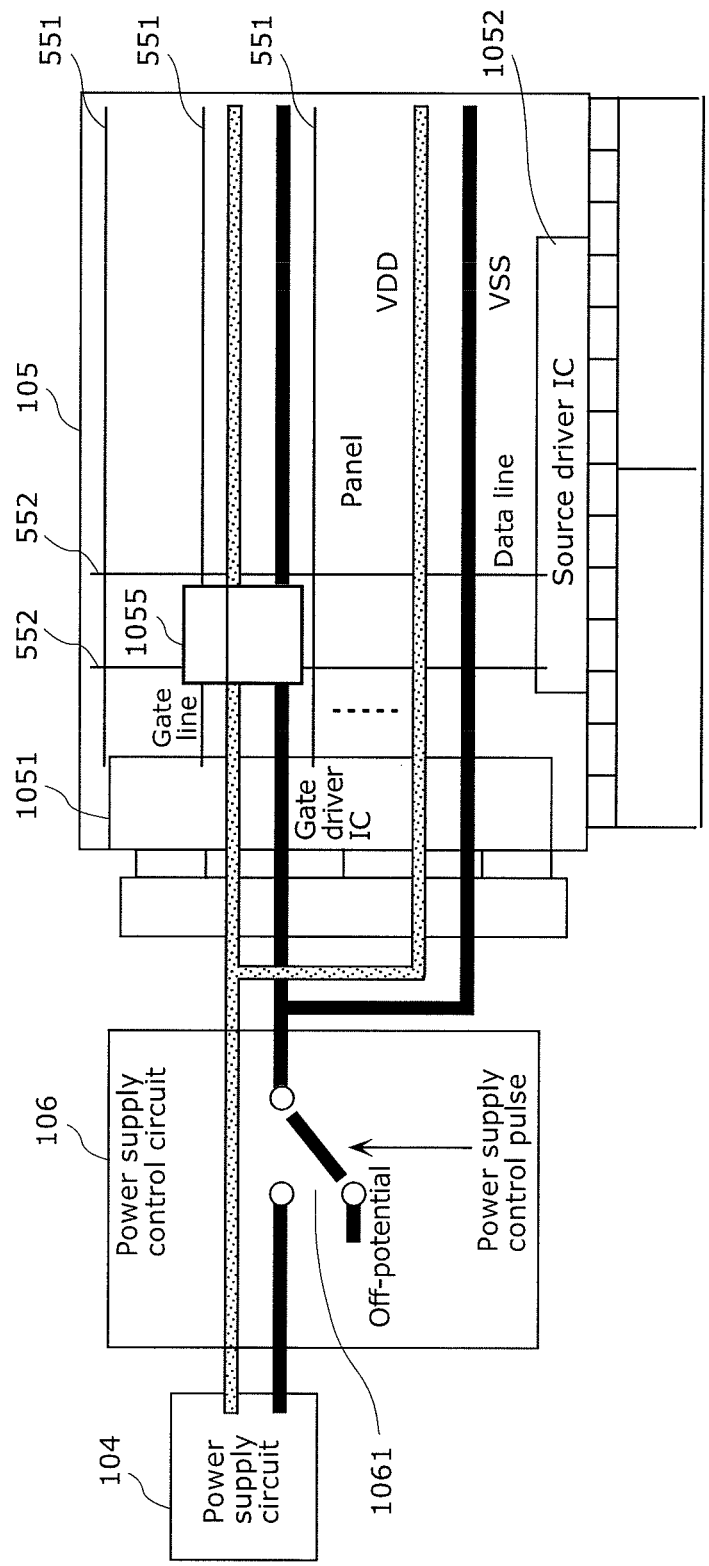
FIG. 4 illustrates a case in which a power supply control circuit according to the embodiment includes a switching device.
Figure 5A:
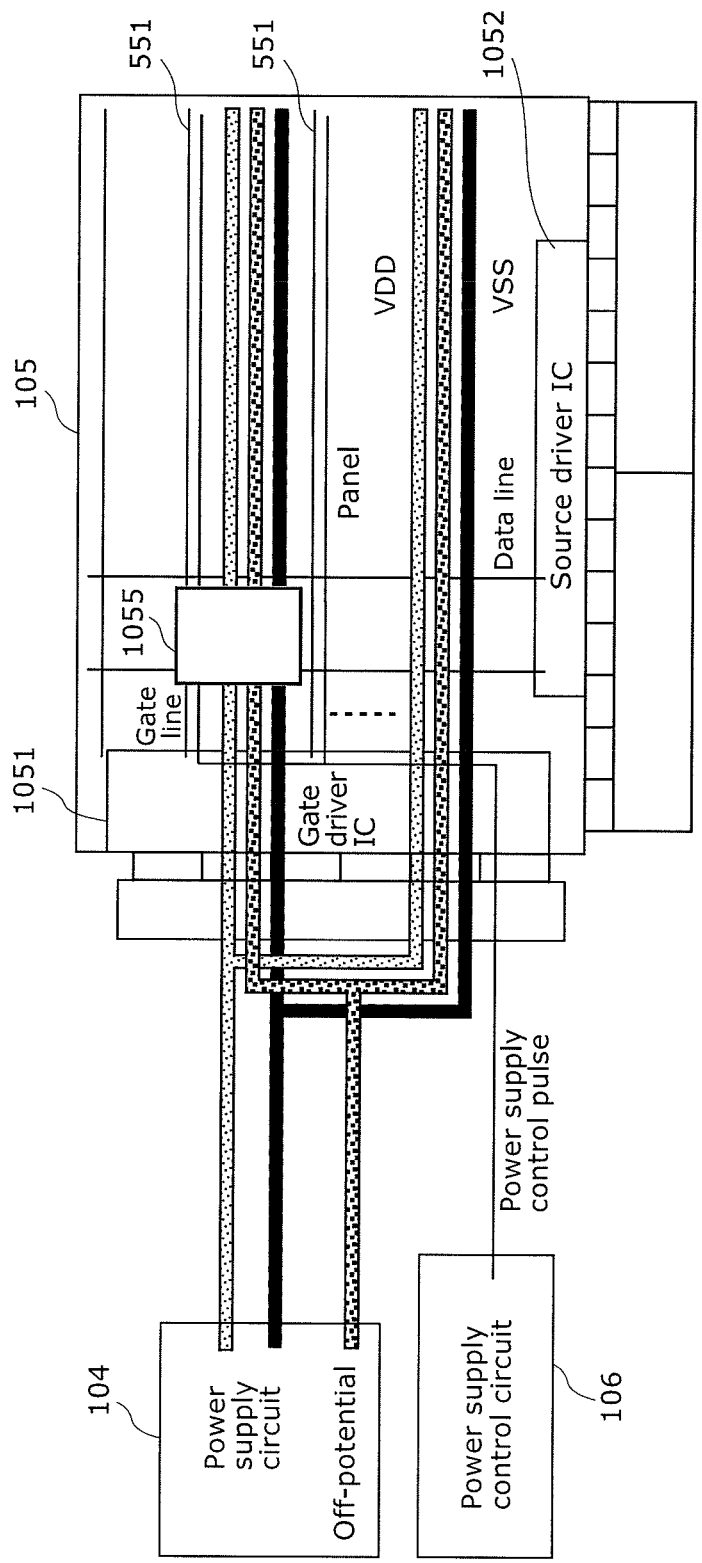
FIG. 5A illustrates a case in which the switching device is provided for each of pixel units in the panel according to the embodiment.
Figure 5B:
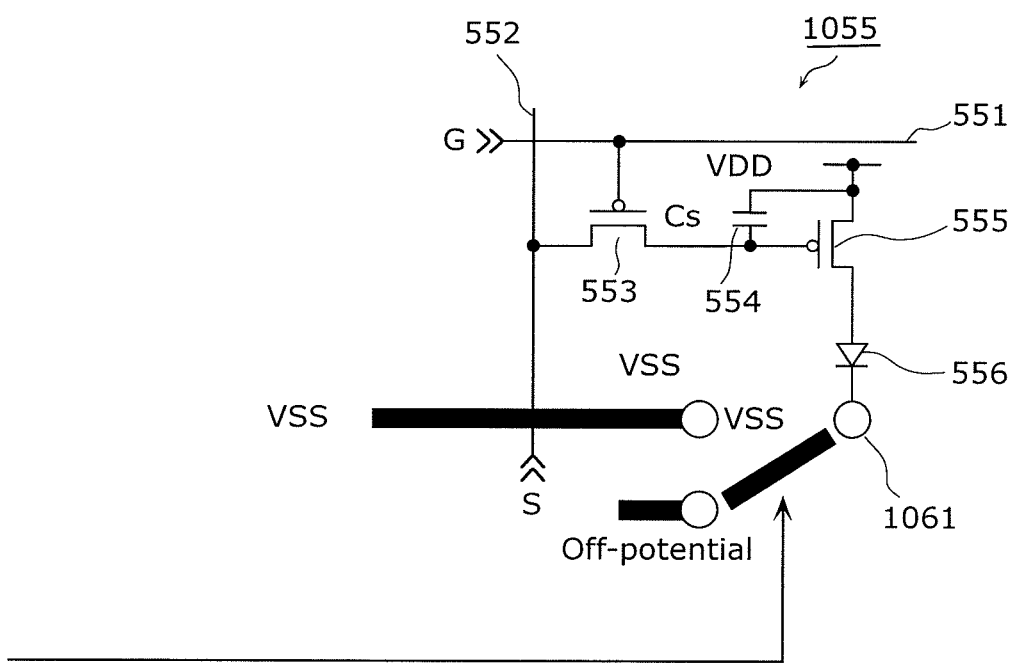
FIG. 5B illustrates a case in which the switching device is provided for each of the pixel units in the panel according to the embodiment.
Figure 6:
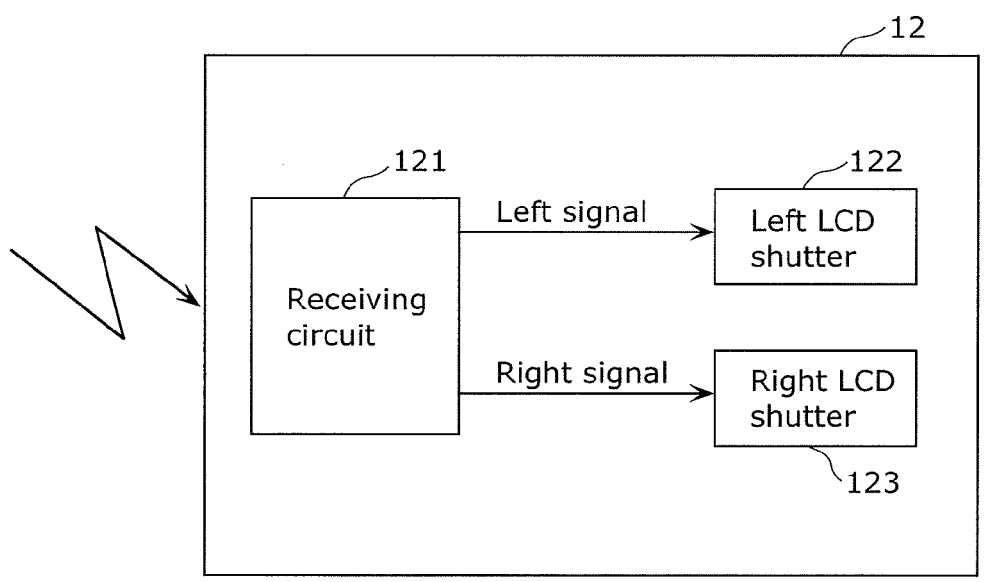
FIG. 6 is a block diagram illustrating a configuration of a pair of shutter-type glasses according to the embodiment.

FIG. 1 illustrates an exemplary system configuration of an organic EL stereoscopic display apparatus according to the embodiment. FIG. 2 is a block diagram illustrating a configuration of the organic EL stereoscopic display apparatus according to the embodiment. FIGS. 3A and 3B are block diagrams illustrating a configuration of a panel according to the embodiment. FIG. 4 illustrates a case in which the power supply control circuit includes a switching device, and FIG. 5A and FIG. 5B illustrate a case in which the switching device is provided for each of the pixel units. FIG. 6 is a block diagram illustrating a configuration of a pair of shutter-type glasses according to the embodiment.

As illustrated in FIG. 1, the organic EL stereoscopic display apparatus 10 is used in combination with an emitter 11 and a pair of shutter-type glasses 12. The emitter 11 is a transmitter used for synchronizing the organic EL stereoscopic display apparatus 10 and the shutter-type glasses 12. The shutter-type glasses 12 are glasses used by a user, including shutters allowing a stereoscopic (three-dimensional) display by showing a right-eye video and a left-eye video displayed by a panel 105 in the organic EL stereoscopic display apparatus 90 sequentially to the user.

As illustrated in FIG. 2, the organic EL stereoscopic display apparatus 10 includes an video signal processing circuit 101, a glasses control circuit 102, a driver circuit 103, a power supply circuit 104, a panel 105, and a power supply control circuit 106.

The video signal processing circuit 101 supplies a control signal for controlling the driver circuit 103 so as to cause light-emission at a pixel unit included in the panel 105, that is, a control signal for the panel 105 to display an image (a left-eye image and a right-eye image) to the driver circuit 103. The video signal processing circuit 101 supplies a right/left timing signal with a synchronizing signal to the glasses control circuit 102 and the power supply control circuit 106, based on the input video signal. Here, the video signal processing circuit 101 supplies the control signal to the driver circuit 103 with timing in synchronization with the synchronizing signal.

The glasses control circuit 102 corresponds to a first control unit according to an aspect of the present disclosure. The glasses control circuit 102 generates a glasses control signal for making the right-eye image and the left-eye image sequentially viewable by the viewer with the shutter-type glasses 12, according to the synchronizing signal and the left/right timing signal input by the video signal processing circuit 101, and supplies the glasses control signal to the emitter 11.

More specifically, the glasses control circuit 102 generates the glasses control signal for closing and opening the shutters on the right and left included by the shutter-type glasses 12, in response to the synchronizing signal and the left/right timing signal provided. For example, the glasses control circuit 102 generates a glasses control signal for opening one of the shutters on the right and left of the shutter-type glasses 12 and for closing the other shutter, according to the synchronizing signal and the right/left timing signal provided. Furthermore, for example, the glasses control circuit 102 generates a glasses control signal for closing the both shutters on the right and left of the shutter-type glasses 12, according to the synchronizing signals and the right/left timing signals provided, in a period when the both shutters on the right and left of the shutter-type glasses 12 upon the switching of an open-state and an closed state of the shutters on the right and left in the shutter-type glasses 12.

The driver circuit 103 drives the panel, according to the input of the control signal provided from the video signal processing circuit 101. More specifically, the driver circuit 103 displays the left-eye image and the right-eye image on the panel 105 by causing the light-emission from the pixel units in the panel 105, according to the input of the control signal provided. More specifically, the driver circuit 103 supplies the gate signal to a gate driver IC 1051 which is a scanning line driver circuit of the panel 105, and supplies the video data (the right-eye image data and the left-eye image data) to a source driver IC 1052 which is a data line driver circuit. With this, the driver circuit 103 causes the panel 105 to sequentially display the left-eye image and the right-eye image by the light-emission of the pixel units in the panel 105.

The panel 105 corresponds to an image display unit according to an aspect of the present disclosure. The panel 105 is controlled (driven) by the driver circuit 103, and displays the video, that is, sequentially displays the right-eye image and the left-eye image for the viewer. As illustrated in FIG. 3A, the panel 105 includes the gate driver IC 1051, the source driver IC 1052, and pixel units 1055. A positive power supply voltage Vdd and a negative power supply voltage Vss are applied to the pixel units 1055.

As illustrated in FIG. 3B, each of the pixel units 1055 includes a switching device (switching transistor) 553 for selecting a target pixel, a capacitor 554, a current-driven driving device (current-driven transistor) 555, and a light-emitting device (display device) 556 which is an organic EL device, for example. A data line 552 is electrically connected to a source or a drain of the switching device 553, and a gate line (scanning line) 551 is electrically connected to a gate of the switching device 553.

A current supply line for supplying current to the current-driven driving device 555 is connected to a source electrode or a drain electrode of the current-driven driving device 555. The positive power supply voltage Vdd is applied to the current supply line, and the negative power supply voltage Vss is applied to a cathode of the light-emitting device 556. In addition, one of the source electrode and the drain electrode of the current-driven driving device 555, which is not connected to the current supply line is connected to an anode of the light-emitting device 556.

Accordingly, when the switching device 553 is turned on, the data voltage from the data line 552 is stored in the capacitor 554. Furthermore, the data voltage is applied to the gate electrode in the current-driven driving device 555, causing a flow of current from the current supply line to the source or drain electrode of the current-driven driving device 555, and thereby supplying the current to the light-emitting device 556. As illustrated in FIG. 3B, the current supplied from the light-emitting device 556 is supplied by a potential difference (voltage) between the positive power supply voltage Vdd applied to the current supply line and the negative power supply voltage Vss applied to the cathode in the light-emitting device 556.

The power supply circuit 104 supplies power to the panel 105 through the power supply control circuit 106. More specifically, the power supply circuit 104 supplies the positive power supply voltage Vdd and the negative power supply voltage Vss to each of the pixel units 1055 in the panel 105. The power supply voltage supplied from the power supply circuit 104 is controlled by the power supply control circuit 106. More specifically, the potential of the negative power supply voltage Vss applied to each of the pixel units 1055 in the panel 105 is switched to an off-potential or an on-potential by a switching device controlled by the power supply control circuit 106. The on-potential is a potential of the negative power supply voltage Vss supplied by the power supply control circuit 106. In contrast, the off-potential is a potential which reduces the voltage between the electrodes of the light-emitting device 556, that is, smaller than the potential difference between the negative power supply voltage Vss and the positive power supply voltage Vdd. With this, this reduces the potential difference between the negative power supply voltage Vss and the positive power supply voltage Vdd, and reducing the luminance of the light-emitting device 556 or stops the light-emission from the light-emitting device 556 (non-light-emitting state).

The power supply control circuit 106 corresponds to a second control unit according to an aspect of the present disclosure, and controls a switching device 1061 for reducing the voltage between the electrodes of the light-emitting device 556. Here, the switching device 1061 may be configured in the power supply control circuit 106, as illustrated in FIG. 4. Alternatively, the switching device 1061 may not be provided in the power supply control circuit 106, but for each pixel unit 1055 in the panel 105, as illustrated in FIG. 5A and FIG. 5B.

The power supply control circuit 106 controls the switching device 1061 according to the synchronizing signal and the right/left timing signal provided from the video signal processing circuit 101. The switching device 1061 controlled by the power supply control circuit 106 switches the potential of the negative power supply voltage Vss to the on-potential or the off-potential, among the positive power supply voltage Vdd and the negative power supply voltage Vss applied to the light-emitting device 556.

More specifically, the power supply control circuit 106 generates a power supply control pulse for controlling the switching device 1061 according to the synchronizing signals and the right/left timing signals provided, and supplies the generated power supply control pulse to the switching device 1061. For example, when a period indicated by the synchronizing signal and the right/left timing signal provided is a period in which one of the shutters on the right and left of the shutter-type glasses 12 is open (or closed), the power supply control circuit 106 generates a power supply control pulse for setting the potential at the switching device 1061 to the on-potential. Furthermore, when the period indicated by the synchronizing signal and the right/left timing signal provided is the non-viewable period in which both of the shutters on the right and left of the shutter-type glasses 12 are closed, the power supply control circuit 106 generates a power supply control pulse for setting the potential at the switching device 1061 to the off-potential.

Note that, a voltage reduced period ($T_{OFF}$) in which the switching device 1061 is in the off-potential is shorter than the non-viewable period ($T_B$) for example, in consideration of the shutter delay in the shutter-type glasses 12 and the switching delay in the switching device 1061. More specifically, the power supply control circuit 106 generates the power supply control pulse for setting the potential at the switching device 1061 to the off-potential in the period $T_{OFF}$ where $T_B > T_{OFF}$. Needless to say, $T_B = T_{OFF}$ is applicable when it is not necessary to take the shutter delay in the shutter-type glasses 12 and the switching delay in the switching device 1061 into consideration.

Here, description of the switching device 1061 configured to be included in the power supply control circuit 106, as illustrated in FIG. 4 shell be made. In this case, the switching device 1061 collectively (at the same time) switches the negative power supply voltage Vss applied to the light-emitting devices 556 to the off-potential or the on-potential. More specifically, the switching device 1061 collectively switches the potential of the negative power supply voltage Vss applied to the light-emitting devices 556 to the off-potential or the on-potential collectively, according to (in synchronization with) the power supply control pulse generated by the power supply control circuit 106.

In contrast, a case in which the switching device 1061 is provided for each of the pixel units 1055 in the panel 105 as illustrated in FIG. 5A and FIG. 5B, instead of being provided in the power supply control circuit 106. In this case, for each of the pixel units, that is, the light-emitting devices 556, the switching device 1061 switches the potential of the negative power supply voltage Vss applied to the cathode of the light-emitting device 556 to the off-potential or the on-potential. More specifically, the switching device 1061 switches the potential of the negative power supply voltage Vss applied to each of the light-emitting devices 556 to the off-potential or the on-potential, according to (in synchronization with) the power supply control pulse generated by the power supply control circuit 106.

As described above, the power supply control circuit 106 controls the switching device 1061 and switches the potential of the negative power supply voltage Vss applied to the light-emitting device 556 to the off-potential. With this, the light-emission from the light-emitting device 556 falls to a state in which the luminance of the emitted light is reduced or the light-emission is stopped (non-light-emitting state).

The emitter 11 is a transmitter used for synchronizing the organic EL stereoscopic display apparatus 10 and the shutter-type glasses 12 with the configuration described above. More specifically, the emitter 11 transmits the glasses control signal generated by the glasses control circuit 102 in the organic EL stereoscopic display apparatus 10 to the shutter-type glasses 12.

For example, when the organic EL stereoscopic display apparatus 10 displays the left-eye image, the emitter 11 transmits a glasses control signal for opening the shutter for the left eye in the shutter-type glasses 12, and for closing the shutter for the right eye from the organic EL stereoscopic display apparatus 10 to the shutter-type glasses 12.

The shutter-type glasses 12 are glasses including shutters allowing a stereoscopic (three-dimensional) display by showing a right-eye image and a left-eye image displayed by the panel 105 in the organic EL stereoscopic display apparatus 90 to the user. The shutter-type glasses 12 correspond to a pair of glasses according to an aspect of the present disclosure, and make the right-eye image and the left-eye image viewable sequentially. The shutter-type glasses 12 includes shutter units on the right and left and a receiving unit, and when the glasses control signal is received by the receiving unit and the shutter units on the right and left are closed, both of the right-eye image and the left-eye image are made non-viewable at the same time.

More specifically, as illustrated in FIG. 6, the shutter-type glasses 12 include a receiving circuit 121, a left LCD shutter 122, and a right LCD shutter 123.

The receiving circuit 121 corresponds to a receiving unit according to an aspect of the present disclosure, and receives the glasses control signal from the organic EL stereoscopic display apparatus 10 through the emitter 11. The receiving circuit 121 generates a right signal to be supplied to the right LCD shutter 123 and a left signal to be supplied to the left LCD shutter 122, according to the glasses control signal received. The receiving circuit 121 supplies the left signal generated to the left LCD shutter 122 and the right signal to the right LCD shutter 123.

The left LCD shutter 122 corresponds to the shutter units on the right and left according to an aspect of the present disclosure, and opens and closes the left LCD shutter according to the left signal supplied by the receiving circuit 121. More specifically, the left LCD shutter 122 opens and closes the left LCD shutter, that is, the shutter corresponding to the left eye of the viewer, according to the left signal supplied by the receiving circuit 121.

The right LCD shutter 123 corresponds to the shutter units on the right and left according to an aspect of the present disclosure, and opens and closes the right LCD shutter, according to the right signal supplied by the receiving circuit 121. More specifically, the right LCD shutter 123 opens and closes the right LCD shutter, that is, the shutter corresponding to the right eye of the viewer, according to the right signal supplied by the receiving circuit 121.

As described above, when the organic EL stereoscopic display apparatus 10 (panel 105) displays the left-eye image, the shutter-type glasses 12 opens the shutter for the left eye, and closes the shutter for the right eye, according to the glasses control signal from the organic EL stereoscopic display apparatus 10 (glasses control circuit 102). In contrast, when the organic EL stereoscopic display apparatus 10 (panel 105) displays the right-eye image, the shutter-type glasses 12 opens the shutter for the right eye, and closes the shutter for the left eye, according to the glass control signal from the organic EL stereoscopic display apparatus 10 (glasses control circuit 102).

Furthermore, in the non-viewable period included in the glasses control signal received, the shutter-type glasses 12 generates the right signal and the left signal according to the glasses control signal received, and sets the left LCD shutter 122 and the right LCD shutter 123 to the closed state by closing the shutters, according to the right signal and the left signal generated. Note that, the non-viewable period is a period in which both of the shutters on the right and left of the shutter-type glasses 12 are closed upon switching the open-state and the closed state of the shutters on the right and left of the shutter-type glasses 12. In this non-viewable period, the right signal and the left signal are set such that both of the shutters on the right and left of the shutter-type glasses 12 so as to make the right-eye image and the left-eye image non-viewable at the same time.

Next, the operations of the organic EL stereoscopic display apparatus 10 and the shutter-type glasses 12 with the configuration described above shall be described.

FIG. 7 is a diagram for illustrating an example of light-emission timing for displaying the video on the panel. Note that, FIG. 7 illustrates a case in which the shutter delay in the shutter-type glasses 12 and the switching delay in the switching device 1061 are not considered.

The display video, that is, the right-eye image and the left-eye image for the viewer are sequentially displayed on the panel 105 (pixel unit 1055) with timing synchronized to the synchronizing signal by the driver circuit 103, as illustrated in FIG. 7(a) and FIG. 7(b).

The video signal processing circuit 101 supplies left/right timing signal with the synchronizing signal with timing illustrated in FIG. 7(c). Note that, in the example illustrated in FIG. 7(c), the left/right timing signal is supplied separately as the left timing signal and the right timing signal.

Furthermore, a power supply control pulse illustrated in FIG. 7(d) and the glasses control signal illustrated in FIG. 7(e) are generated according to the synchronizing signal, the left timing signal, and the right timing signal.

The glasses control signal is a signal for controlling the left LCD shutter 122 and the right LCD shutter 123 included in the shutter-type glasses 12. The glasses control signal is generated by the glasses control circuit 102 as illustrated in FIG. 7(e) according to the synchronizing signal, the left timing signal, and the right timing signal. In the example illustrated in FIG. 7(e), a signal for one pulse is generated for controlling opening and closing of the left LCD shutter 122, and is included in the glasses control signal. Furthermore, a signal for two pulses is generated for controlling opening and closing of the right LCD shutter 123, and is included in the glasses control signal. Here, a pulse signal for changing the left LCD shutter 122 to the open state (start) and a pulse signal for changing the left LCD shutter 122 to the closed state (end) are generated to have the same width. In the same manner, the two-pulse signal for opening (start) the right LCD shutter 123 and the two-pulse signal for closing (end) the right LCD shutter 123 are generated to have the same interval.

Here, the shutter-type glasses 12 receive the glasses control signal illustrated in FIG. 7(e) through the emitter 11. The shutter-type glasses 12 generate the left signal and the right signal illustrated in FIG. 7(f), according to the glasses control signal received. Subsequently, the shutter-type glasses 12 controls opening and closing of the left LCD shutter 122 and the right LCD shutter 123, according to the left signal and the right signal generated. Here, the period which is illustrated as $T_B$ illustrated in FIG. 7(e) corresponds to the non-viewable period, and is a period in which both of the shutters on the right and left are closed upon switching the opening state and the closed state of the shutters on the right and left of the shutter-type glasses 12. That is, the period $T_B$ is when the left LCD shutter 122 and the right LCD shutter 123 are closed and are in the closed state.

In contrast, the power supply control pulse is a signal for controlling the switching device 1061. The power supply control pulse is generated by the power supply control circuit 106 as illustrated in FIG. 7(d), according to the synchronizing signal, the left timing signal, and the right timing signal. In the example illustrated in FIG. 7(d), the power supply control pulse is generated as rising (to the high level), when controlling the switching device 1061 to set the potential at the negative power supply voltage Vss applied to the light-emitting device 556 to the on-potential. In contrast, the power supply control pulse is generated as falling (to the low level), when controlling the switching device 1061 to set the potential at the negative power supply potential Vss applied to the light-emitting device 556 to the off-potential.

The switching device 1061 is controlled by the power supply control pulse generated as illustrated in FIG. 7(d). Here, the period illustrated as $T_{OFF}$ in FIG. 7(d) corresponds to a voltage reduced period, and is a period when the switching device 1061 is in the off-potential. Stated differently, the voltage reduced period is a period when the negative power supply voltage Vss at the light-emitting device 556 is in the off-potential, that is, when a voltage between electrodes of the light-emitting device 556 is reduced. Note that, as described above, the voltage reduced period may be a period when the voltage between the electrodes of the light-emitting device 556 is zero, that is, a period in which the voltage is reduced to a level where the light-emitting device 556 does not emit light. Accordingly, the off-potential may be a potential which is smaller than the potential difference between the negative power supply voltage Vss and the positive power supply voltage Vdd.

As described above, by having the organic EL stereoscopic display apparatus 10 and the shutter-type glasses 12 operating, it is possible to reduce the luminance of the light-emitting device by reducing the voltage between the electrodes of the light-emitting device during the closed period; that is, the non-viewable period of the shutter-type glasses 12. With this, it is possible to reduce the excessive power consumed by the organic EL stereoscopic display apparatus 10.

In addition, since the power supply control circuit 106 controls the switching device 1061, the pixel unit 1055 in the panel 105 can reduce the light-emission from the light-emitting device 556 or stop the light emission while holding the data voltage in the capacitor 554. This not only allows reduction (reduced light) the luminance in the light-emitting device 556 or stops the light emission at high speed, but also allows recovering the luminance or re-light-emission at high speed. Stated differently, the data of the image displayed by the pixel unit 1055 in the panel 105 is not lost. Accordingly, it is possible to perform light-emission or light reduction (quenching) operation at high speed.

Note that, in the description above, a case in which the shutter delay of the shutter-type glasses 12 and the switching delay in the switching device 1061 are not considered has been described. However, in reality, the shutter delay in the shutter-type glasses 12 and the switching delay in the switching device 1061 occur. FIG. 8 illustrates a case according to this embodiment in which the shutter delay in the shutter-type glasses and the switching delay in the switching device occur. Note that, FIG. 8(a) to FIG. 8(c), and FIG. 8(e) and FIG. 7(a) to FIG. 7(d) are the same charts. Accordingly, the description for the drawings is omitted.

The shutter-type glasses 12 generates the left signal and the right signal illustrated in FIG. 7(f), according to the glasses control signal received, and controls opening and closing of the left LCD shutter 122 and the right LCD shutter 123. The left LCD shutter 122 and the right LCD shutter 123 open and close the shutters, according to the left signal and the right signal. However, in this case, the delay illustrated in FIG. 8(d) occurs since it takes time to open and close the left LCD shutter 122 and the right LCD shutter 123.

The same applies to the switching device 1061. The switching device 1061 is controlled by the power supply control pulse generated by the power supply control circuit 106, and switches the potential at the negative power supply voltage Vss to be applied to the light-emitting device 566 between the off-potential and the on-potential. In this case, it takes time for the switching device 1061 to switch between the off-potential and the on-potential. This causes a delay (response delay) illustrated in FIG. 8(f). Note that, when the switching device 1061 is provided in the power supply control circuit 106, there will be a larger response delay than a case in which one switching device 1061 is provided for each pixel unit 1055.

In view of the above, the voltage reduced period may be adjusted in consideration of the delay between opening and closing the shutters on the right and left of the shutter-type glasses 12. Furthermore, the voltage reduced period may be adjusted in consideration of the response delay in the switching device 1061. Stated differently, in consideration of the delay in opening and closing of the shutters on the right and left of the shutter-type glasses 12, and the response delay in the switching device 1061, the voltage reduced period may be adjusted by adjusting the timing for generating the power supply control pulse signal.

FIG. 9 is a diagram for illustrating another example of light-emission timing for displaying the video on the panel. Note that, FIG. 9 illustrates a case in which the voltage reduced period is adjusted in consideration of the shutter delay in the shutter-type glasses 12 and the switching delay in the switching device 1061 are taken into consideration for adjustment. Note that, FIG. 9(a) to FIG. 9(d) and FIG. 8(a) to FIG. 8(d) are the same charts. Accordingly, the description for the drawings is omitted.

Due to the shutter delay in the shutter-type glasses 12 as illustrated in FIG. 9(d), a net non-viewable period $T_B'$ is shorter than the non-viewable period $T_B$ due to the shutter delay in the shutter-type glasses 12.

The voltage reduced period is adjusted in consideration of this point. FIG. 9(e) and FIG. 9(f) illustrates this adjustment. More specifically, first, the non-viewable period $T_B$ is set to the net non-viewable period $T_B'$ calculated in consideration of the shutter delay in the shutter-type glasses 12. The adjustment is performed based on the net non-viewable period $T_B'$ in which the voltage reduced period is adjusted.

More specifically, the net non-viewable period $T_B'$ is calculated as follows. More specifically, the net non-viewable period $T_B'$ is calculated based on a period from transmission of the glasses control signal for closing both of the shutters on the right and left of the shutter-type glasses 12 to transmission of the glasses control signal for opening the both of the shutters on the right and left of the shutter-type glasses 12 (non-viewable period $T_B$) and in consideration of at least one of a delay period from the transmission of the glasses control signal for closing the both of the shutters on the right and left of the shutter-type glasses 12 to a time when both of the shutters on the right and left of the shutter-type glasses 12 are closed, and a delay period from the transmission of the glasses control signal for opening the both of the shutters on the right and left of the shutter-type glasses 12 to a time when both of the shutters on the right and left of the shutter-type glasses 12 are open. Here, the timing for transmitting the glasses control signal and the timing for generating and supplying the left-signal and the right signal are synchronized. Accordingly, the transmission of the glasses control signal corresponds to the supply of the left-signal and the right-signal to the left LCD shutter 122 and the right LCD shutter 123, respectively.

In contrast, a net voltage reduced period $T_{OFF}'$ is longer than the voltage reduced period $T_{OFF}$ due to the response delay in the switching device 1061, as illustrated in FIG. 9(f). Accordingly, the net voltage reduced period $T_{OFF}'$ is longer than the voltage reduced period $T_{OFF}$ in the switching device 1061 set by the power supply control pulse by the response delay of the switching device 1061.

Subsequently, the voltage reduced period may be adjusted in consideration of the net voltage reduced period $T_{OFF}$. The voltage reduced period $T_{OFF}$ may be the net voltage reduced period $T_{OFF}'$ calculated in consideration of the response delay in the switching device 1061.

In addition, in consideration of the above, the net voltage reduced period $T_{OFF}'$ may be the net non-viewable period $T_B'$. Stated differently, the voltage reduced period $T_{OFF}$ may be adjusted to be shorter than the non-viewable period $T_B'$ calculated from the non-viewable period $T_B$ by the response delay of the switching device 1061.

As described above, the voltage reduced period is adjusted in consideration of the time (delay) in the switching device and the light-emitting device, and the non-viewable period is adjusted in consideration with the time necessary for opening and closing the shutter unit after the glasses receive the glasses control signal. With this, it is possible for the voltage reduced period to be adjusted based on the non-viewable period (closed period). When the non-viewable period in the shutter-type glasses 12 ends and the video is in the viewable state, it is possible to securely restore the luminance in the light-emitting element.

According to this embodiment described above, the organic EL stereoscopic display apparatus 10 is capable of reducing the voltage between the electrodes of the light-emitting device and reduce the luminance (reduce light or stop light-emission) during the closed period, that is, the non-viewable period of the shutter-type glasses 12. With this, it is possible to reduce the excessive power consumed by the organic EL stereoscopic display apparatus 10.

In addition, since the power supply control circuit 106 can control the switching device 1061, the pixel unit 1055 in the panel 105 can reduce or stop the light-emission from the light-emitting device 556 while holding the data voltage in the capacitor 554. This not only allows reduction in the luminance in or stops light-emission from the light-emitting device 556 at high speed, but also allows restoring the luminance or re-light-emission at high speed. Stated differently, the data of the image displayed by the pixel unit 1055 in the panel 105 is not lost. Accordingly, it is possible to perform light-emission or light quenching operation at high speed.

As described above, according to the present disclosure, the stereoscopic display apparatus capable of suppressing the power consumption and the method for driving the stereoscopic display apparatus can be implemented.

The stereoscopic display apparatus and the method for driving the stereoscopic display apparatus disclosed herein are to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

The present disclosure is applicable to the organic EL display apparatus and the method for controlling the organic EL display apparatus, and particularly applicable to an FPD display apparatus such as a television.

The invention claimed is:

1. A stereoscopic display apparatus including: an image display unit which sequentially displays a right-eye image and a left-eye image; and a pair of glasses which makes the right-eye image and the left-eye image viewable sequentially, the stereoscopic display apparatus comprising:
a plurality of organic electroluminescence (EL) devices comprising a display unit of the image display unit;
a power supply line for supplying current to each of the organic EL devices;
a switching device provided on the power supply line and capable of reducing a voltage between electrodes in the organic EL device;
a first control unit configured to generate a glasses control signal for setting, in the glasses, a non-viewable period in which both the right-eye image and the left-eye image are made non-viewable at the same time; and
a second control unit configured to generate a device control signal for setting, in the switching device, a voltage reduced period in which the voltage between the electrodes in the organic EL device is reduced,
wherein the first control unit and the second control unit control the glasses and the switching device by generating the glasses control signal and the device control signal, respectively, for setting the non-viewable period to be a period at least from a start to an end of the voltage reduced period, and
the second control unit is configured to generate the device control signal for setting the voltage reduced period based on a period from a time at which the switching device is turned off to a time at which the switching device is turned on and at least one of (i) a delay period from a time at which the switching device is turned off to a time at which the voltage between the electrodes in the organic EL device is reduced and (ii) a delay period from a time at which the switching device is turned on to a time at which the voltage between the electrodes in the organic EL device is restored to the voltage before the reduction, the non-viewable period being longer than a length of the voltage reduced period.

2. The stereoscopic display apparatus according to claim 1, wherein the second control unit generates a device control signal for setting the voltage reduced period in which the voltage between the electrodes in the organic EL device is reduced to a voltage at which light-emission from the organic EL device is turned off.

3. The stereoscopic display apparatus according to claim 1, wherein the glasses includes: shutter units on the right and left; and a receiving unit, and
both the right-eye image and the left-eye image are made non-viewable at the same time when the receiving unit receives the glasses control signal and the shutter units are in a closed state.

4. The stereoscopic display apparatus according to claim 3, wherein the non-viewable period is set based on a period from transmission of the glasses control signal for setting the shutter units to the closed state to transmission of the glasses control signal for setting one of the shutter units to an open state and at least one of (i) a delay period from transmission of the glasses control signal for setting the shutter units to the closed state to a time at which the shutter units are in the closed state and (ii) a delay period from the transmission of the glasses control signal for setting the one of the shutter units to the open state to a time at which the one of the shutter units is in the open state.

5. A method for driving a stereoscopic display apparatus including: an image display unit which sequentially displays a right-eye image and a left-eye image; and a pair of glasses which makes the right-eye image and the left-eye image viewable sequentially, the method comprising providing a non-viewable period in which both the right-eye image and the left-eye image are made non-viewable at the same time by the glasses and providing a voltage reduced period in which the voltage between electrodes in an organic EL device included in the image display unit is reduced, wherein the non-viewable period is adjusted to be a period at least from a start to an end of the voltage reduced period, and the voltage reduced period is set based on a period from a time at which a switching device is turned off to a time at which the switching device is turned on and at least one of (i) a delay period from a time at which the switching device is turned off to a time at which the voltage between the electrodes in the organic EL device is reduced and (ii) a delay period from a time at which the switching device is turned on to a time at which the voltage between the electrodes in the organic EL device is restored to the voltage before the reduction.

6. The method for driving the stereoscopic display apparatus according to claim 5, the glasses including: shutter units on the right and left; and a receiving unit, the method further comprising making the right-eye image and the left-eye image non-viewable at the same time when the receiving unit receives a glasses control signal for setting the non-viewable period and the shutter units are in a closed state.

7. The method for driving the stereoscopic display apparatus according to claim 6, wherein the non-viewable period is set based on a period from transmission of the glasses control signal for setting the shutter units to a closed state to transmission of the glasses control signal for setting one of the shutter units to an open state and at least one of (i) a delay period from transmission of the glasses control signal for setting the shutter units to the closed state to a time at which the shutter units are in the closed state and (ii) a delay period from the transmission of the glasses control signal for setting the one of the shutter units to the open state to a time at which the one of the shutter units is in the open state.

* * * * *